(12) United States Patent
Harada et al.

(10) Patent No.: US 8,804,594 B2
(45) Date of Patent: Aug. 12, 2014

(54) RADIO COMMUNICATION SYSTEM, SERVER, AND RADIO COMMUNICATION METHOD

(75) Inventors: Yuya Harada, Kawasaki (JP); Dai Kimura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 44 days.

(21) Appl. No.: 13/331,147

(22) Filed: Dec. 20, 2011

(65) Prior Publication Data

US 2012/0201185 A1    Aug. 9, 2012

(30) Foreign Application Priority Data

Feb. 7, 2011    (JP) ................................. 2011-023886

(51) Int. Cl.
*H04H 20/71*    (2008.01)
*H04M 3/42*    (2006.01)

(52) U.S. Cl.
USPC ........................................ 370/312; 455/414.1

(58) Field of Classification Search
None
See application file for complete search history.

(56) References Cited

U.S. PATENT DOCUMENTS

| | | | |
|---|---|---|---|
| 2002/0091527 A1* | 7/2002 | Shiau | 704/270.1 |
| 2002/0177451 A1* | 11/2002 | Ogasawara | 455/456 |
| 2004/0181572 A1 | 9/2004 | Lee et al. | |
| 2005/0144162 A1* | 6/2005 | Liang | 707/3 |
| 2007/0271257 A1 | 11/2007 | Kari et al. | |
| 2007/0298842 A1* | 12/2007 | Kamada et al. | 455/566 |
| 2009/0303909 A1* | 12/2009 | Farhoudi et al. | 370/312 |
| 2011/0276557 A1* | 11/2011 | Chen et al. | 707/706 |

FOREIGN PATENT DOCUMENTS

| | | |
|---|---|---|
| JP | 10-257100 | 9/1998 |
| JP | 2001-223732 | 8/2001 |
| JP | 2005-502135 | 1/2005 |
| JP | 2008-252347 | 10/2008 |
| JP | 2011-018971 | 1/2011 |
| WO | WO 03/021987 | 3/2003 |

OTHER PUBLICATIONS

Japanese Office Action dated Apr. 30, 2014 in corresponding Japanese Application No. 2011-023886, 4 pages.

* cited by examiner

*Primary Examiner* — Kevin C Harper
*Assistant Examiner* — Samina Choudhry
(74) *Attorney, Agent, or Firm* — Staas & Halsey LLP

(57) ABSTRACT

A radio communication system includes a first server and a second server. The first server includes a first processor to receive, together with an identifier for identifying a base station, communication information transmitted from a plurality of mobile stations via the base station, extract, for the base station, a keyword frequently used in communications between the first server and the plurality of mobile stations on the basis of the received communication information and the received identifier, and transmit the extracted keyword together with the identifier. The second server includes a second processor to receive, together with the identifier, the keyword transmitted from the first server, and distribute distribution information corresponding to the received keyword to the plurality of mobile stations via the base station.

9 Claims, 12 Drawing Sheets

FIG. 2

| BASE STATION ID | KEY WORDS | | | |
|---|---|---|---|---|
| B1 | CAKE(130) | GIFT(240) | TRAVEL(200) | ... |
| B2 | CURRY(150) | TV(67) | CELL PHONE(98) | ... |
| ... | ... | ... | ... | ... |

| BASE STATION ID | FIRST KW | SECOND KW | ... |
|---|---|---|---|
| B1 | GIFT | TRAVEL | ... |
| B2 | CURRY | CELL PHONE | ... |
| ... | ... | ... | ... |

13a

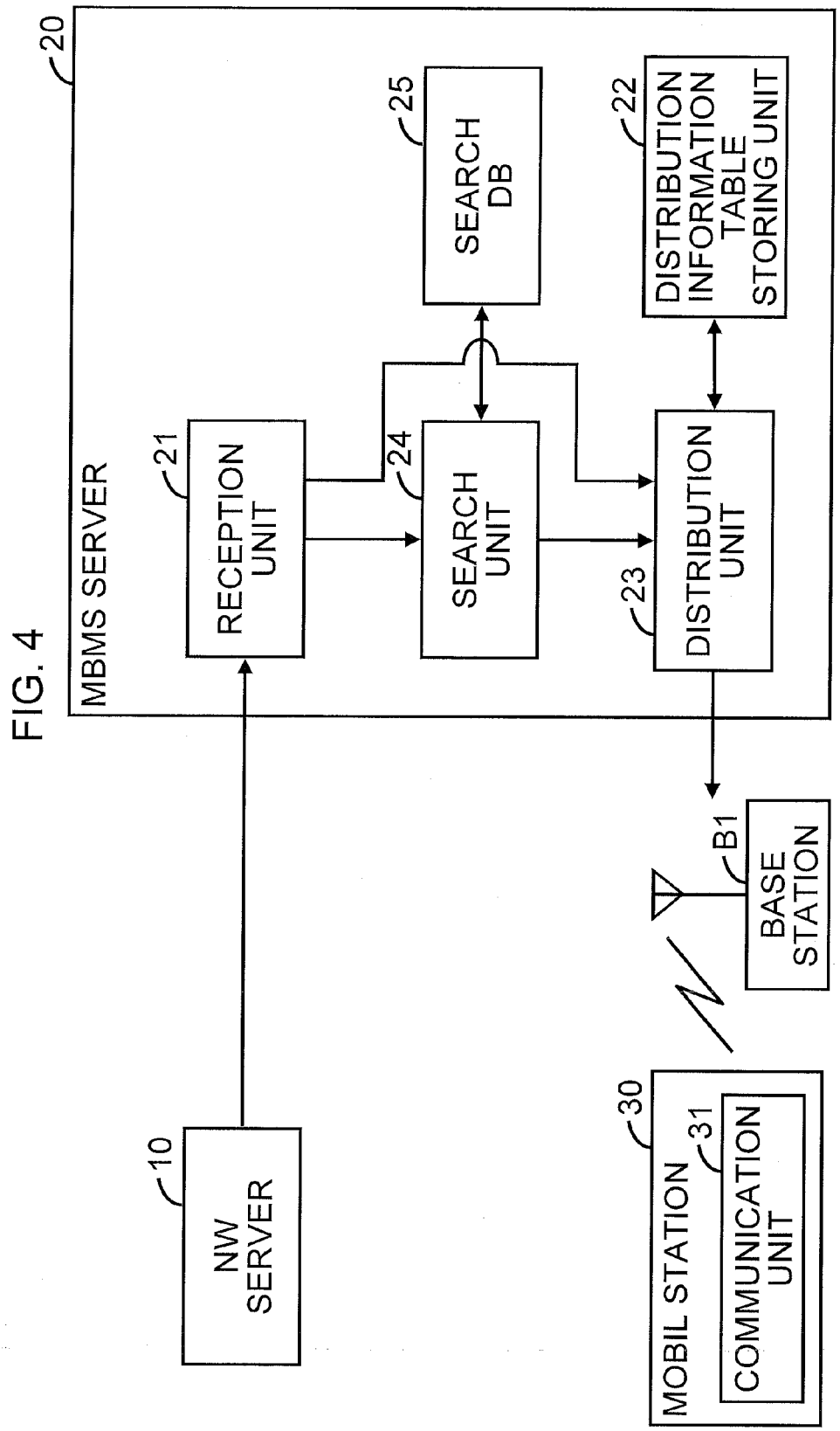

| KEYWORD | DISTRIBUTION TIME | DISTRIBUTION INFORMATION |
|---|---|---|
| GIFT | SUMMER | SUMMER GIFT |
|  | WINTER | YEAR-END GIFT |

| KEYWORD | DISTRIBUTION LOCATION | DISTRIBUTION INFORMATION |
|---|---|---|
| CURRY | CAMP SITE | RECIPE |
|  | DOWNTOWN | CURRY SHOP |

| | FIRST DISTRIBUTION INFORMATION | SECOND DISTRIBUTION INFORMATION |
|---|---|---|
| BASE STATION B1 | gift information for year-end gift | foreign travel plan for new year season |
| BASE STATION B2 | shop information regarding curry shop | information regarding latest model of cell phone |
| ... | ... | ... |

RADIO COMMUNICATION SYSTEM, SERVER, AND RADIO COMMUNICATION METHOD

CROSS-REFERENCE TO RELATED APPLICATION

This application is based upon and claims the benefit of priority of the prior Japanese Patent Application No. 2011-023886, filed on Feb. 7, 2011, the entire contents of which are incorporated herein by reference.

FIELD

The embodiments discussed herein are related to a radio communication system, a server, and a radio communication method.

BACKGROUND

A technique called multimedia broadcast and multicast service (MBMS) in radio communication between a mobile station and a base station is currently available. MBMS is a technique for efficiently distributing multimedia contents such as moving images and music over a cell phone network. Multicast communication is given as one of features of MBMS. In the multicast communication, a base station transmits the same data to a plurality of mobile stations using the same frequency band. The multicast communication has been studied for mainly a service of distributing moving images and music. Since the multicast communication allows distribution of information in a lump to a plurality of mobile stations by using the same frequency band, such a merit is obtained that resources are more effectively utilized than in one-to-one communication (unicast communication).

Japanese Laid-open Patent Publication No. 2005-502135, Japanese Laid-open Patent Publication No. 10-257100, and Japanese Laid-open Patent Publication No. 2008-252347 disclose related techniques.

SUMMARY

According to an aspect of the present invention, provided is a radio communication system including a first server and a second server. The first server includes a first processor to receive, together with an identifier for identifying a base station, communication information transmitted from a plurality of mobile stations via the base station, extract, for the base station, a keyword frequently used in communications between the first server and the plurality of mobile stations on the basis of the received communication information and the received identifier, and transmit the extracted keyword together with the identifier. The second server includes a second processor to receive, together with the identifier, the keyword transmitted from the first server, and distribute distribution information corresponding to the received keyword to the plurality of mobile stations via the base station.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 2 is a diagram illustrating an exemplary KW list held in an NW server according to an embodiment of the present invention;

FIG. 3 is a diagram illustrating an exemplary KW table held in an NW server according to an embodiment of the present invention;

FIG. 4 is a diagram illustrating exemplary functional configurations of an MBMS server and a mobile station according to an embodiment of the present invention;

FIGS. 5A and 5B are diagrams illustrating exemplary data contained in distribution information tables held in an MBMS server according to an embodiment of the present invention;

FIG. 6 is a diagram illustrating exemplary distribution information distributed by a distribution unit according to an embodiment of the present invention;

DESCRIPTION OF EMBODIMENTS

Since information that is distributed by the multicast communication is determined on the information distributing side, distributed information does not always meet the needs of a user of a mobile station. That is, although a telecommunications carrier is expected to provide information that suits the environment and the taste of each user, it is difficult for the telecommunications carrier to determine whether information to be distributed suits the user of each mobile station with accuracy at all times. In particular, the above-mentioned problem is noticeable for a user, such as a user of a mobile station, whose desired information changes depending on the date/time and the location.

Thus, it is preferable to provide a radio communication system, a mobile station, and a radio communication method that provides information that would meet the needs of a user of a mobile station.

The embodiments of a radio communication system may provide information that would meet the needs of a user of a mobile station.

Embodiments of a radio communication system, a mobile station, and a radio communication method will be discussed in detail with reference to the accompanying drawings. Embodiments of the present invention are not limited to the following embodiments.

Figure 1:
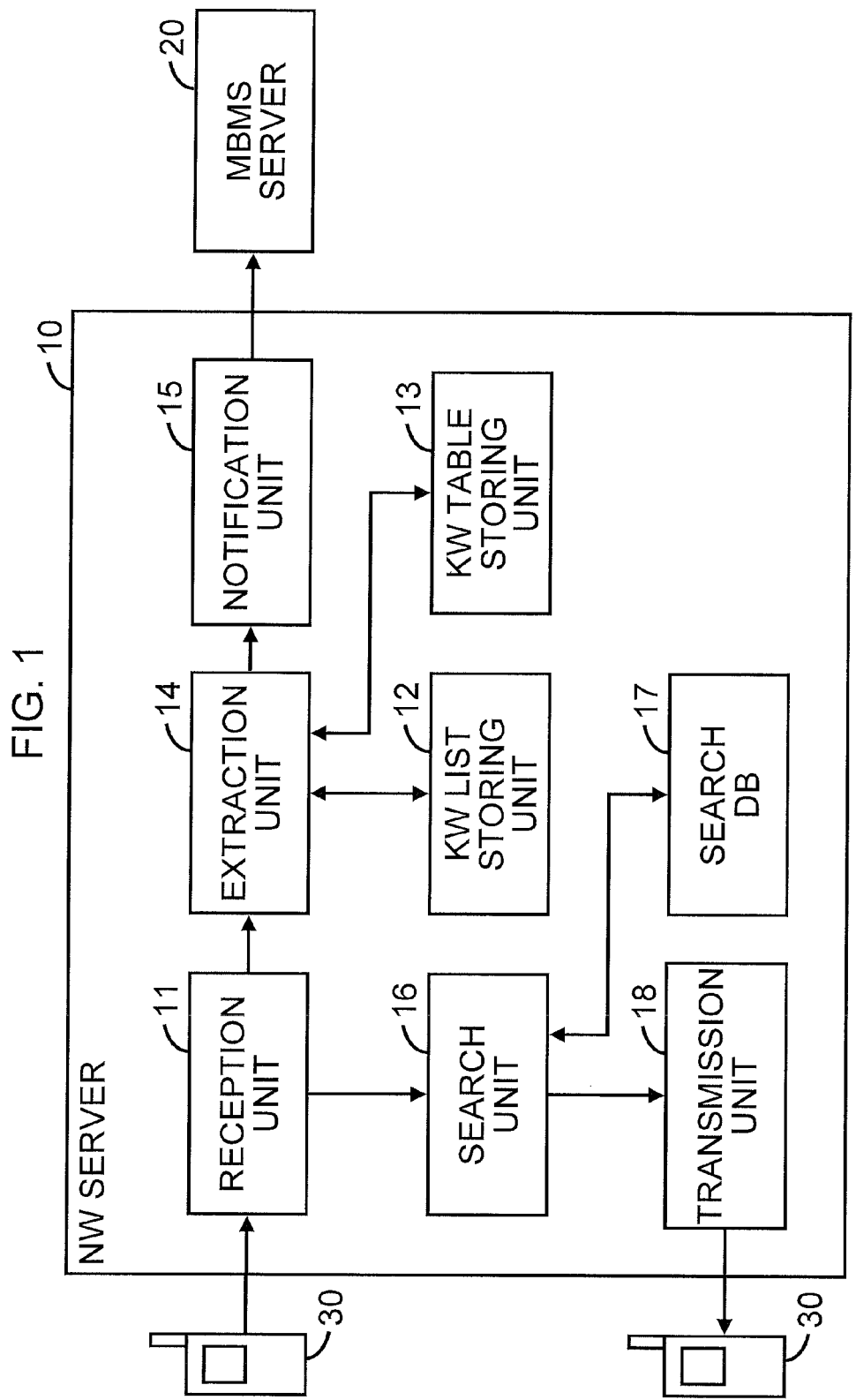
FIG. 1 is a diagram illustrating an exemplary functional configuration of a network server according to an embodiment of the present invention.

First, a functional configuration of a network server (hereinafter, also referred to as an NW server) according to an embodiment of the present invention will be discussed. FIG. 1 illustrates an exemplary functional configuration of a NW server 10 according to the present embodiment. As illustrated in FIG. 1, the NW server 10 includes a reception unit 11, a keyword (hereinafter, also referred to as a KW) list storing unit 12, a KW table storing unit 13, an extraction unit 14, a notification unit 15, a search unit 16, a search database (DB) 17, and a transmission unit 18. These constitutional units are connected with one another so that a signal or data is input or output uni-directionally or bi-directionally. The NW server 10 transmits and receives various kinds of information to and from a mobile station 30 via the reception unit 11 and the transmission unit 18.

The reception unit 11 receives communication information (referred to as transmitted information) that is transmitted from a plurality of mobile stations via a base station together with an identifier (ID) of the base station. The transmitted information includes, for example, a word (hereinafter, referred to as a "search word") that a mobile station has used for information search, information regarding a Web site, mail data, and call information. The reception unit 11 also receives search words transmitted from the plurality of mobile stations via the base station together with the IDs of the mobile stations.

FIG. 2 illustrates an exemplary KW list held in the NW server according to the present embodiment. The KW list storing unit 12 stores a KW list 12a as illustrated in FIG. 2. The KW list 12a is a list that the NW server 10 refers to when extracting a KW from the transmitted information that the NW server 10 has received. As illustrated in FIG. 2, the KW list 12a contains, for each base station ID, a plurality of keywords as candidates for keywords to be extracted by the extraction unit 14. For example, the KW list 12a contains "CAKE (130)", "GIFT (240)", "TRAVEL (200)" and others as KWs for determining information to be distributed to the base station ID "B1". The KW list 12a also contains "CURRY (150)", "TV (67)", and "CELL PHONE (98)" for determining information to be distributed to the base station ID "B2". The NW server 10 selects KWs useful for distributing user-oriented information from among many words included in the transmitted information with reference to data that is stored in advance in the KW list 12a, when notifying a MBMS server 20 of the KWs. That is, the extraction unit 14 checks a word included in the transmitted information against a KW contained the KW list 12a to extract only a matched word, that is, a word included in both the KW list 12a and the transmitted information as the KW. Although the KW list 12a contains different KWs for different base station IDs in the example in FIG. 2, the KW list 12a may contain the same KWs for respective base station IDs.

As discussed above, the NW server 10 holds the KW list 12a and extracts only the KWs useful for determining information to be distributed which would suit the environment and taste of each user who belongs to each base station in comparison with a case in which only frequently used KWs are extracted unconditionally from transmitted information. In other words, using the KW list 12a for filtering in the KW extraction makes it possible to remove, from among candidates for the KWs, phrases (for example, "Good luck!" and "That's all") which are well used in daily life but may be unnecessary for determining information to be distributed. In addition, since the MBMS server 20 stores distribution information of the number corresponding to that of KWs and noises of the KWs are removed by using the KW list 12a, the data size required to store the distribution information may be reduced and KW-based determination of distribution information may be made rapidly.

FIG. 3 illustrates an exemplary KW table held in the NW server according to the present embodiment. The KW table storing unit 13 stores a KW table 13a as illustrated in FIG. 3. The KW table 13a contains frequently used KWs for each base station ID. The KWs are stored in descending order of use frequency and may be updated occasionally. For example, in FIG. 3, "GIFT" is stored as a "FIRST KW" item indicating the most frequently used KW and "TRAVEL" is stored as a "SECOND KW" item indicating the second most frequently used KW for the base station having the base station ID "B1". Likewise, "CURRY" is stored as the "FIRST KW" item indicating the most frequently used KW and "CELL PHONE" is stored as the "SECOND KW" item indicating the second most frequently used KW for the base station having the base station ID "B2". Thus, the NW server 10 may determine, when receiving transmitted information via the base station B1, that the KW "GIFT" is most frequently included in the information and the KW "TRAVEL" is second most frequently included therein.

The extraction unit 14 extracts KWs that are frequently used in the communications between the NW server 10 and the plurality of mobile stations on the basis of the transmitted information and the base station IDs that the reception unit 11 has received. The extraction unit 14 first extracts a plurality of words on the basis of the transmitted information and then determines the KWs for notification from among the extracted plurality of words. As a method of extracting words on the basis of transmitted information, a method of using the search words may be used. The extraction unit 14 may extract words from a Web site corresponding to a uniform resource locator (URL) specified by the mobile station for data transmission. The extraction unit 14 may extract words from mails that the mobile station transmits and receives. The extraction unit 14 may extract words from call information of the mobile station. The extracted words are subjected to selection based on the KW list 12a and then the selected words are stored in the KW table 13a as candidates for KWs for notification in descending order of use frequency. The KWs are stored for each base station ID. The KWs to be stored and the order in which the KWs are stored are occasionally changed with increase/decrease in their use frequencies.

The extraction unit 14 counts the usage of each KW listed in the KW list 12a for a predetermined period of time for each base station ID. The extraction unit 14 stores the KWs in descending order of usage (use frequency) for the predetermined period of time as the first KW, the second KW, and the third KW in the KW table 13a so as to be updatable. The extraction unit 14 refers to the KW table 13a and extracts, as the KW of the corresponding base station ID, the KW that is stored as the first KW at the time of extraction. For example, when the data stored in the KW table 13a is as illustrated in FIG. 3, the KWs to be extracted will be "GIFT" for the base station B1 and "CURRY" for the base station B2.

The number of KWs stored in the KW table 13a may be plural for one base station ID, and the number of KWs that the extraction unit 14 extracts may also be plural. For example, the extraction unit 14 may extract three most frequently used KWs and a distribution unit 23 (discussed later with reference to FIG. 4) may determine information to be distributed on the basis of these three KWs. In such a case, since the MBMS server 20 is notified of three KWs for one base station, the MBMS server 20 may provide distribution information that would more match each user by determining the distribution information on the basis of a combination of these KWs. Contrary to determination of one piece of distribution information on the basis of a plurality of KWs, the distribution unit 23 may determine a plurality of pieces of distribution information on the basis of one KW. Further, the extraction unit 14 may extract three most frequently used KWs, and the distribution unit 23 may sequentially distribute information corresponding to these KWs at a predetermined time interval. Thus, even when distribution information that is important for a user is made to correspond to a KW other than the most frequently used KW, the MBMS server 20 may distribute the information with certainty.

The notification unit 15 notifies the MBMS server 20 of the KW extracted by the extraction unit 14 together with the corresponding base station ID.

On the basis of the search word transmitted from a mobile station, the search unit 16 extracts information regarding a Web site or the like including the word from the search DB 17 and outputs the extracted information to the transmission unit 18 as a search result. The transmission unit 18 transmits the search result input from the search unit 16 to the mobile station that has requested the search.

Next, an exemplary functional configuration of the MBMS server according to one embodiment of the present invention will be discussed. FIG. 4 illustrates exemplary functional configurations of the MBMS server 20 and the mobile station 30 according to the present embodiment. As illustrated in FIG. 4, the MBMS server 20 includes a reception unit 21, a distribution information table storing unit 22, the distribution unit 23, a search unit 24, and a search DB 25. These constitutional units are connected with one another so that a signal or data is input or output uni-directionally or bi-directionally.

The reception unit 21 receives, together with the corresponding base station ID, the KW that the notification unit 15 of the NW server 10 has transmitted.

The distribution information table storing unit 22 stores distribution information tables. FIGS. 5A and 5B illustrate exemplary data contained in the distribution information tables 22a and 22b, respectively, held in the MBMS server. Information to be distributed to a plurality of mobile stations is stored in advance in the distribution information tables, in correspondence with a KW, as distribution information. The distribution information may correspond to each KW on a one-to-one basis or a plurality of pieces of distribution information may be stored for one KW. FIG. 5A illustrates an exemplary distribution information table 22a held in the MBMS server. With respect to a KW "GIFT", a plurality of pieces of information which are distributed in accordance with distribution seasons are stored in the distribution information table 22a illustrated in FIG. 5A. That is, the distribution information table 22a is configured such that information regarding "SUMMER GIFT" and related goods may be distributed when the distribution season is "SUMMER", and information regarding "YEAR-END GIFT" and Christmas presents may be distributed when the distribution season is "WINTER". Since information that each user desires differs for different season even when the same KW "GIFT" is given, information regarding gifts of the kinds for the season will be distributed to each mobile station with reference to the above-mentioned distribution information table 22a. As a result, information that may meet the needs of the user of each mobile station may be provided.

FIG. 5B illustrates another exemplary distribution information table 22b held in the MBMS server. With respect to a KW "CURRY", a plurality of pieces of information which are distributed in accordance with distribution locations are stored in the distribution information table 22b illustrated in FIG. 5B. That is, the distribution information table 22b is configured such that information regarding "RECIPE" is distributed when the distribution location is "CAMP SITE" and its surroundings, and information regarding "CURRY SHOP" is distributed when the distribution location is "DOWNTOWN" or a tourist resort. That is, even when the same KW "CURRY" has been given, distribution information differs depending on the location at which the information is to be distributed. For example, when "CURRY" has been extracted as the KW corresponding to a base station located in "CAMP SITE", since the user around the base station may need to know the recipe of curry, the information regarding "RECIPE" will be distributed. On the other hand, when "CURRY" has been extracted as the KW corresponding to a base station located in "DOWNTOWN", since there is a possibility that the user around the base station is seeking for a good curry shop nearby, the information regarding "CURRY SHOP" will be distributed. Thus, it may become possible for the user of the mobile station to obtain desired information corresponding to the current location and for the MBMS server 20 to provide appropriate information that would meet the needs of the user.

The distribution unit 23 distributes information corresponding to a KW to the plurality of mobile stations via the base station corresponding to the KW. The distribution unit 23 determines the information to be distributed to the base station corresponding to the KW on the basis of the notified KW. Since the notified KW is occasionally updated with a change of the information transmitted to the NW server 10 from mobile stations via the base station, the distribution information is also updated with the update of the KW. Each time the distribution information is updated, the distribution unit 23 distributes the updated distribution information to the mobile stations connected to the corresponding base station. Broadcast distribution may be used as the distribution method, not limited to the multicast distribution and either a push-type or a pull-type method may be used.

FIG. 6 illustrates exemplary distribution information 23a distributed by the distribution unit 23. Upon receiving a base station ID and a KW from the NW server 10, the distribution unit 23 distributes information corresponding to the KW to the corresponding base station. As illustrated in FIG. 6, for example, "gift information for year-end gift" is distributed as the first distribution information and "foreign travel plan for new year season" is distributed as the second distribution information to the base station B1. In addition, "shop information regarding curry shop" is distributed as the first distribution information and "information regarding latest model of cell phone" is distributed as the second distribution information to the base station B2. Although an example in which different information is distributed to each base station is illustrated in FIG. 6, the same information may be distributed to a plurality of base stations. To the contrary, a plurality of pieces of different information may be distributed to the same base station at a predetermined time interval.

The distribution unit 23 may monitor a KW received from the NW server 10 each time a predetermined period of time (for example, about 10 to 30 minutes) has elapsed and distribute information only when the KW has been changed. Thus, information is not distributed when the KW is not changed and hence information is provided to the user of each mobile station with minimum distribution. As a result, resources involved in information distribution may be saved.

The search unit 24 of the MBMS server 20 illustrated in FIG. 4 extracts information regarding a Web site or the like including the word from the search DB 25 on the basis of the search word transmitted from the mobile station 30 and outputs the extracted information to the distribution unit 23 as a search result.

The mobile station 30 includes a communication unit 31. The communication unit 31 transmits the above-mentioned transmitted information to the NW server 10 via the base station B1 and receives the information distributed from the MBMS server 20 via the base station B1.

Figure 7:
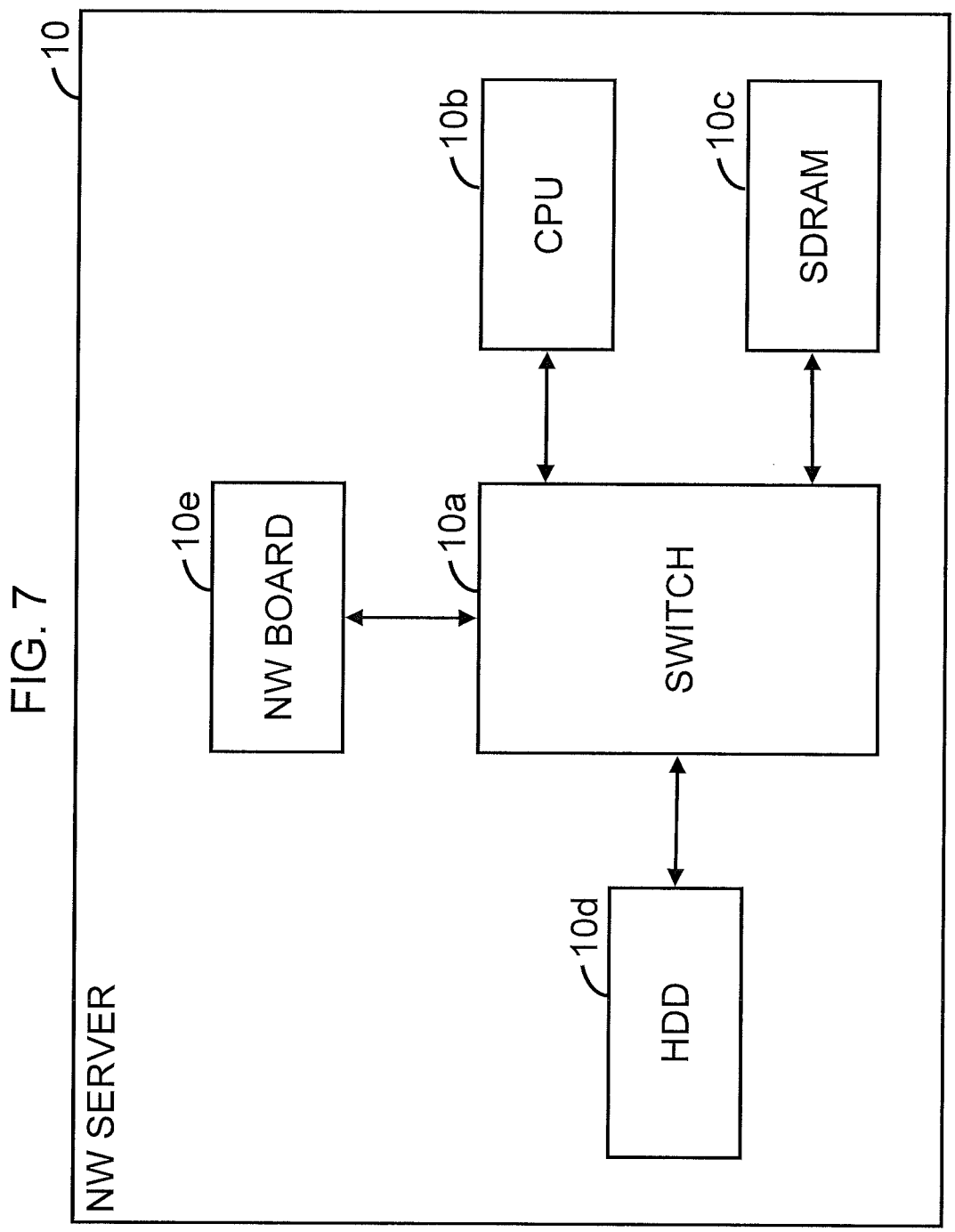
FIG. 7 is a diagram illustrating an exemplary hardware configuration of an NW server according to an embodiment of the present invention.

Next, hardware configurations of the NW server 10, the MBMS server 20, and the mobile station 30 will be discussed. FIG. 7 illustrates an exemplary hardware configuration of the NW server 10. As illustrated in FIG. 7, the NW server 10 includes a central processing unit (CPU) 10b, a synchronous dynamic random access memory (SDRAM) 10c, a hard disk drive (HDD) 10d, and an NW board 10e which are physically connected with one another via a switch 10a so as to input and output various signals and data. The reception unit 11, the notification unit 15, the transmission unit 18 of the NW server 10 are implemented, for example, by the NW board 10e. The KW list storing unit 12, the KW table storing unit 13, and the search DB 17 are implemented, for example, by the SDRAM 10c and the HDD 10d. The extraction unit 14 and the search unit 16 are implemented, for example, by the CPU 10b.

Figure 8:
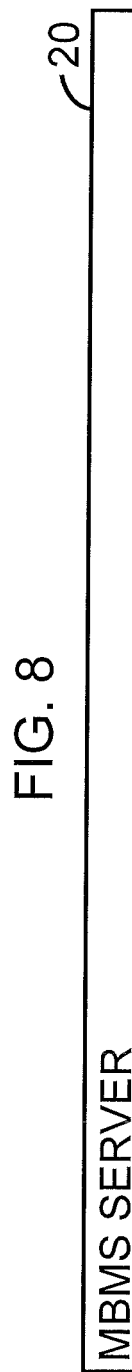
FIG. 8 is a diagram illustrating an exemplary hardware configuration of an MBMS server according to an embodiment of the present invention.

FIG. 8 illustrates an exemplary hardware configuration of the MBMS server 20. As illustrated in FIG. 8, the MBMS server 20 physically has a configuration that is similar to that of the NW server 10. That is, the MBMS server 20 includes a CPU 20b, an SDRAM 20c, an HDD 20d, and an NW board 20e which are physically connected with one another via a switch 20a so as to input and output various signals and data in. The reception unit 21 and the distribution unit 23 of the MBMS server 20 are implemented, for example, by the NW board 20e. The distribution information table storing unit 22 and the search DB 25 are implemented, for example, by the SDRAM 20c and the HDD 20d. The search unit 24 is implemented, for example, by the CPU 20b.

Figure 9:
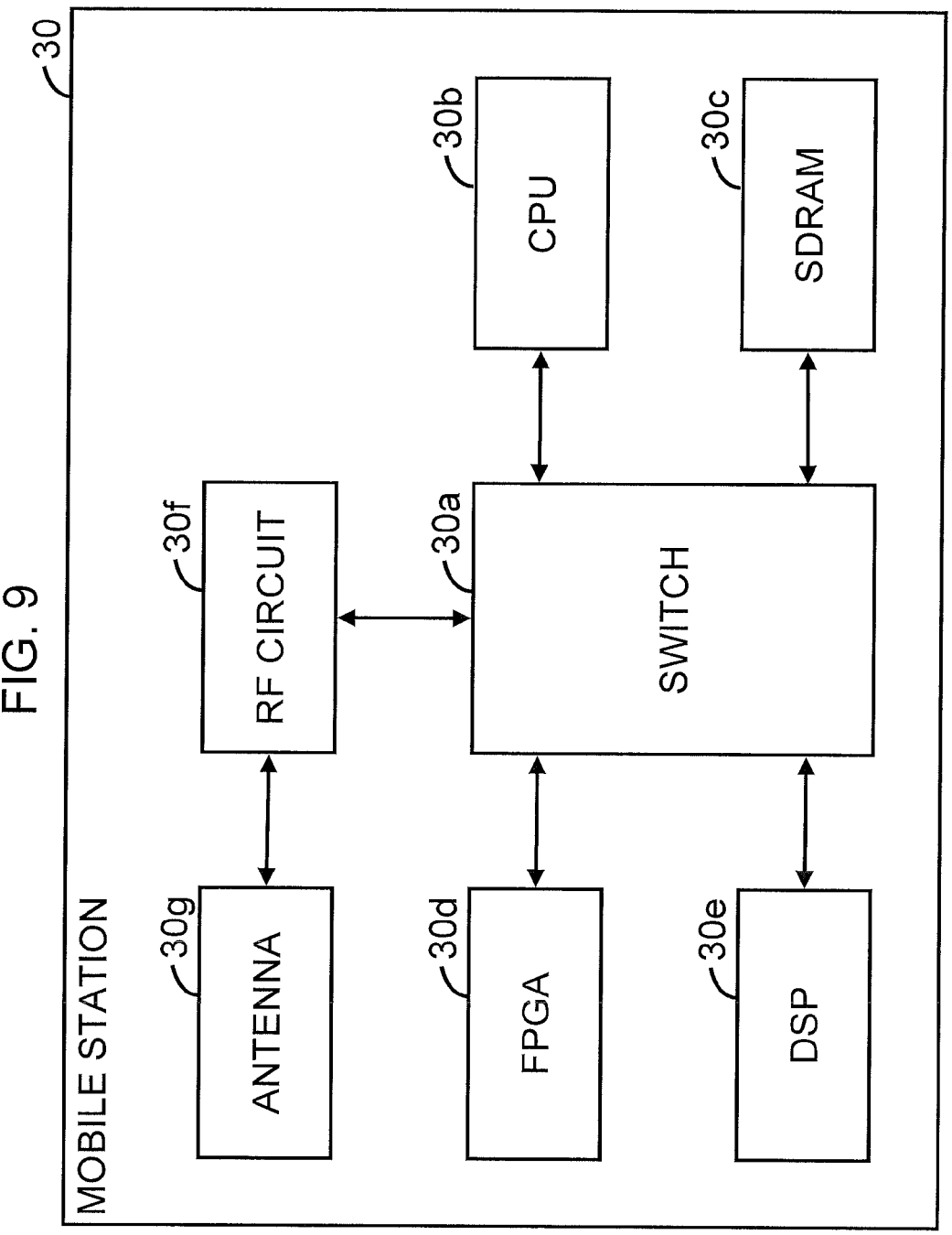
FIG. 9 is a diagram illustrating an exemplary hardware configuration of a mobile station according to an embodiment of the present invention.

FIG. 9 illustrates an exemplary hardware configuration of the mobile station. As illustrated in FIG. 9, the mobile station 30 includes a CPU 30b, an SDRAM 30c, a field programmable gate array (FPGA) 30d, a digital signal processor (DSP) 30e, and a radio frequency (RF) circuit 30f which are physically connected with one another via a switch 30a so as to input and output various signals and data. The mobile station 30 also includes an antenna 30g that is connected to the RF circuit 30f. The communication unit 31 of the mobile station 30 is implemented, for example, by the RF circuit 30f.

Next, operations of a radio communication system according to the embodiment will be discussed.

Figure 10:
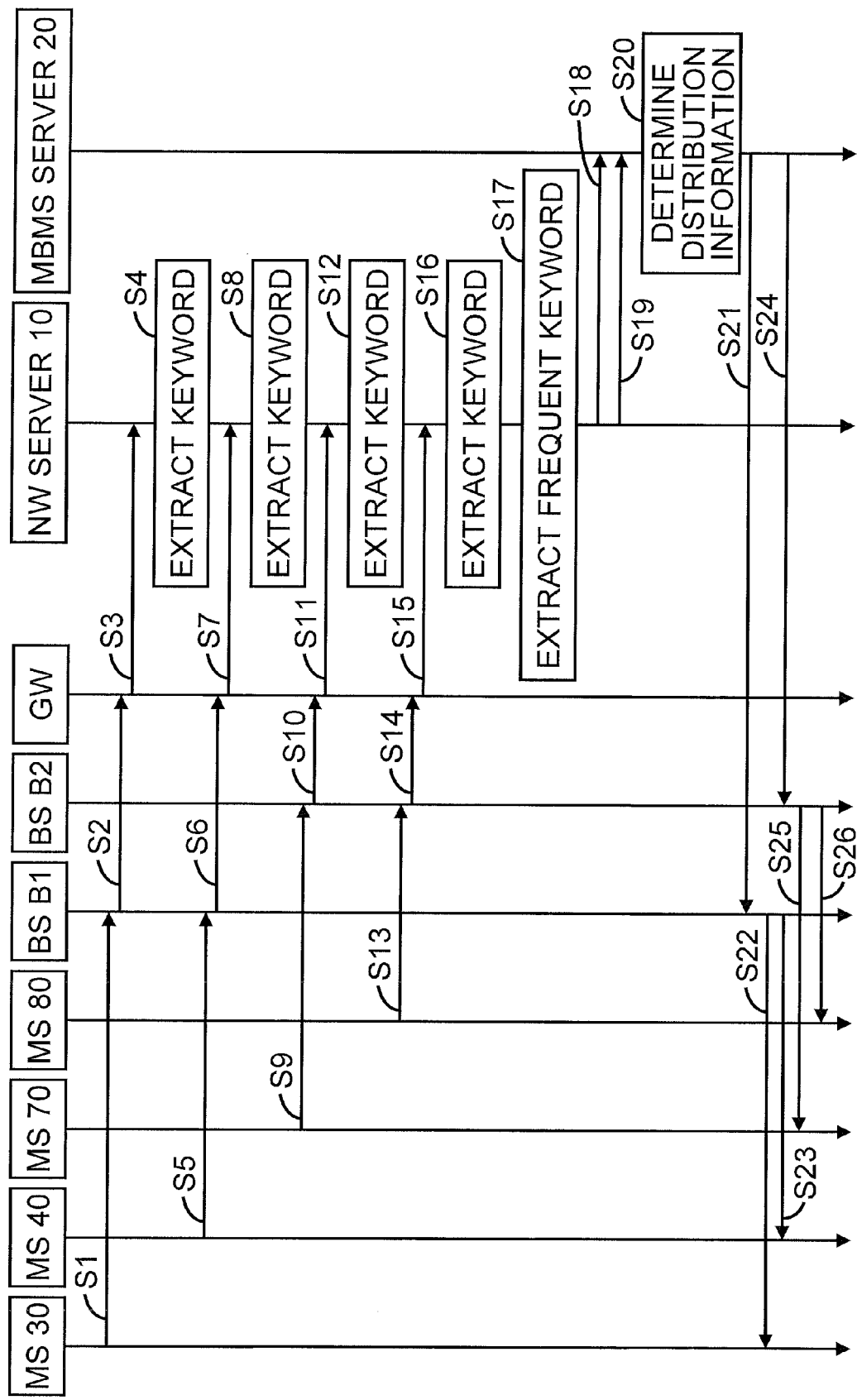
FIG. 10 is a diagram illustrating exemplary operations of a radio communication system according to an embodiment of the present invention.

FIG. 10 illustrates exemplary operations of a radio communication system according to the present embodiment. In this example, it is assumed that mobile stations (denoted by MSs in the drawings) 30 and 40 are located in a communication area of the base station (denoted by BS in the drawings) B1, and mobile stations 70 and 80 are located in a communication area of the base station B2. It is also assumed that mobile stations 40, 70, and 80 have the same configuration as the mobile station 30.

In S1, the mobile station 30 transmits information involved in mail transmission or Web site search to the base station B1.

In S2, the base station B1 adds the ID thereof to the transmitted information and transmits the information in the form of packets to the NW server 10.

In S3, the packets are relayed by a gateway (denoted by GW in the drawings).

In S4, the extraction unit 14 of the NW server 10 extracts a KW from the transmitted information accompanied with the base station ID, which has been received in S3.

In S5 to S8, the series of operations executed in the above S1 to S4 are also executed similarly with respect to the other mobile station 40 that is also connected to the base station B1.

In S9, the mobile station 70 transmits information involved in mail transmission or Web site search to the base station B2.

In S10, the base station B2 adds the ID thereof to the transmitted information and transmits the information in the form of packets to the NW server 10.

In S11, the packets are relayed by the gateway.

In S12, the extraction unit 14 of the NW server 10 extracts a KW from the transmitted information accompanied with the base station ID, which has been received in S11.

In S13 to S16, the series of operations executed in the above S9 to S12 are also executed similarly with respect to the other mobile station 80 that is also connected to the base station B2.

In S17, the NW server 10 extracts the most frequently used KWs from among the KWs extracted in S4, S8, S12, and S16. Extraction of the most frequently used KWs is individually performed for each base station ID, that is, on a group of the KWs extracted in S4 and S8 and on a group of the KWs extracted in S12 and S16.

In S18, the NW server 10 notifies the MBMS server 20 of the most frequently used KW corresponding to the base station ID "B1" in connection with the base station ID "B1".

In S19, the NW server 10 similarly notifies the MBMS server 20 of the most frequently used KW corresponding to the base station ID "B2" in connection with the base station ID "B2".

In S20, the MBMS server 20 determines distribution information corresponding to the KWs that have been received in S18 and S19. The distribution information is determined for each base station ID and is updated upon receiving a new KW.

In S21, the MBMS server 20 transmits the distribution information corresponding to the base station ID "B1" to the base station B1.

In S22 and S23, the base station B1 multicast-distributes the received distribution information to the mobile stations 30 and 40.

In S24, the MBMS server 20 also transmits the distribution information corresponding to the base station ID "B2" to the base station B2 similarly.

In S25 and S26, the base station B2 multicast-distributes the received distribution information to the mobile stations 70 and 80.

Figure 11A:
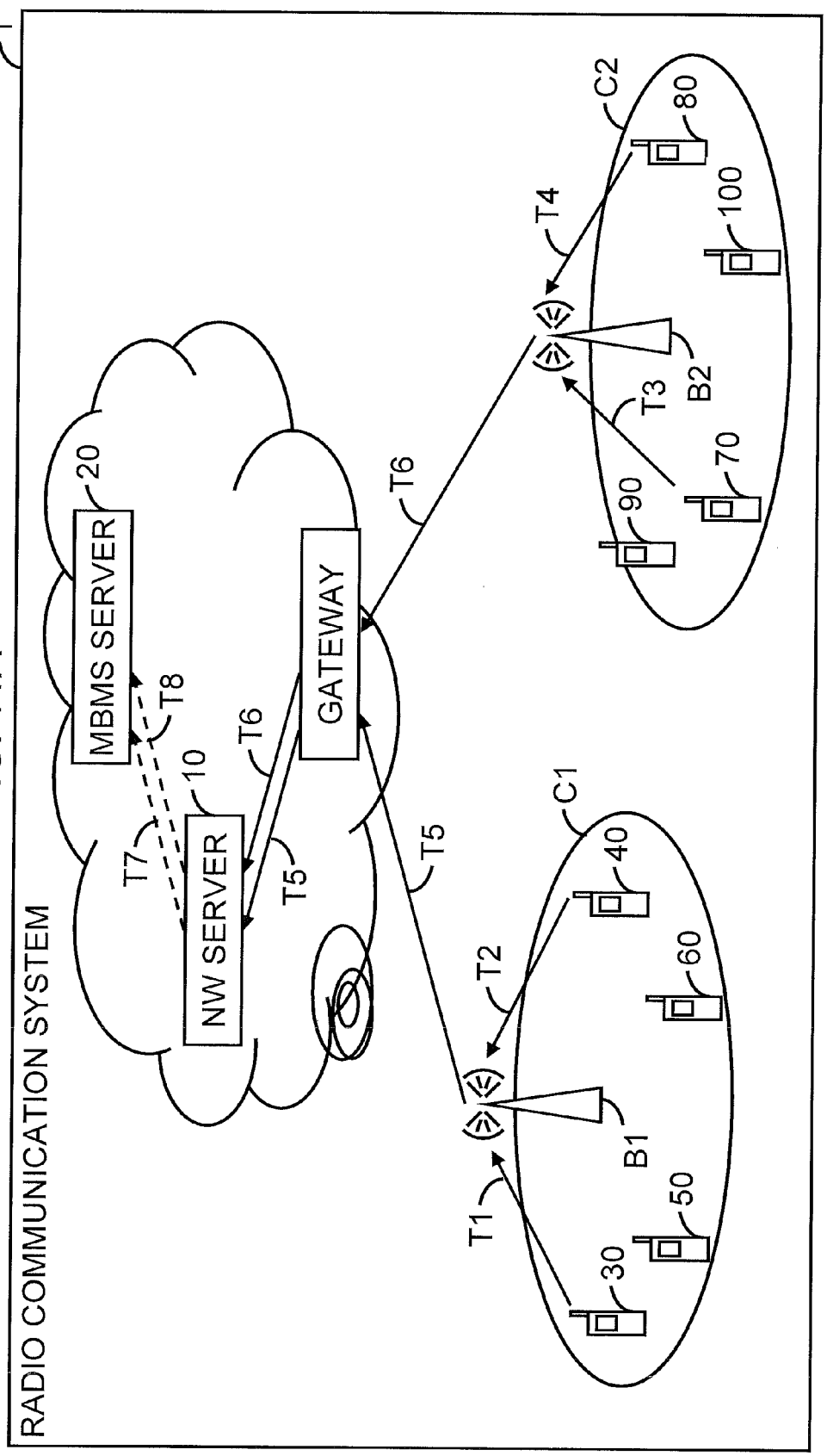
FIG. 11A is a diagram illustrating an exemplary process from word search to determination of distribution information in a radio communication system according to an embodiment of the present invention.

Next, a process from word search to information distribution will be discussed with reference to FIGS. 11A and 11B in an exemplary case where the users of the mobile stations 30, 40, 50, 60, 70, 80, 90, and 100 perform word search. FIG. 11A illustrates an exemplary process from word search to determination of distribution information in the radio communication system 1. In the example of FIG. 11A, the mobile stations 30, 40, 50, and 60 are connected to the base station B1 and the mobile stations 70, 80, 90, and 100 are connected to the base station B2.

In T1 to T4, the mobile stations 30 and 40 belonging to a cell C1 of the base station B1 perform information search by certain words. Likewise, the mobile stations 70 and 80 perform information search by certain words in a cell C2 of the base station B2. The words (search words) used for search are transmitted to the base stations connected to the respective mobile stations.

In T5 and T6, the search words are transmitted to the NW server 10 via the gateway. At that time, the base station IDs are appended as indexes unique to the base stations B1 and B2. The NW server 10 searches for information on the basis of the received search words. The NW server 10 manages the search words for each appended base station ID.

In T7 and T8, the NW server 10 counts the number of search words received in T5 and T6 for a predetermined period of time (for example, about ten minutes to one hour). After the predetermined period of time has elapsed, the NW server 10 determines search words that have been most frequently counted at that time as most frequently used KWs, that is, "KWs for high prioritized information to be distributed to many mobile stations" and notifies the MBMS server 20 of the most frequently used KWs.

Figure 11B:
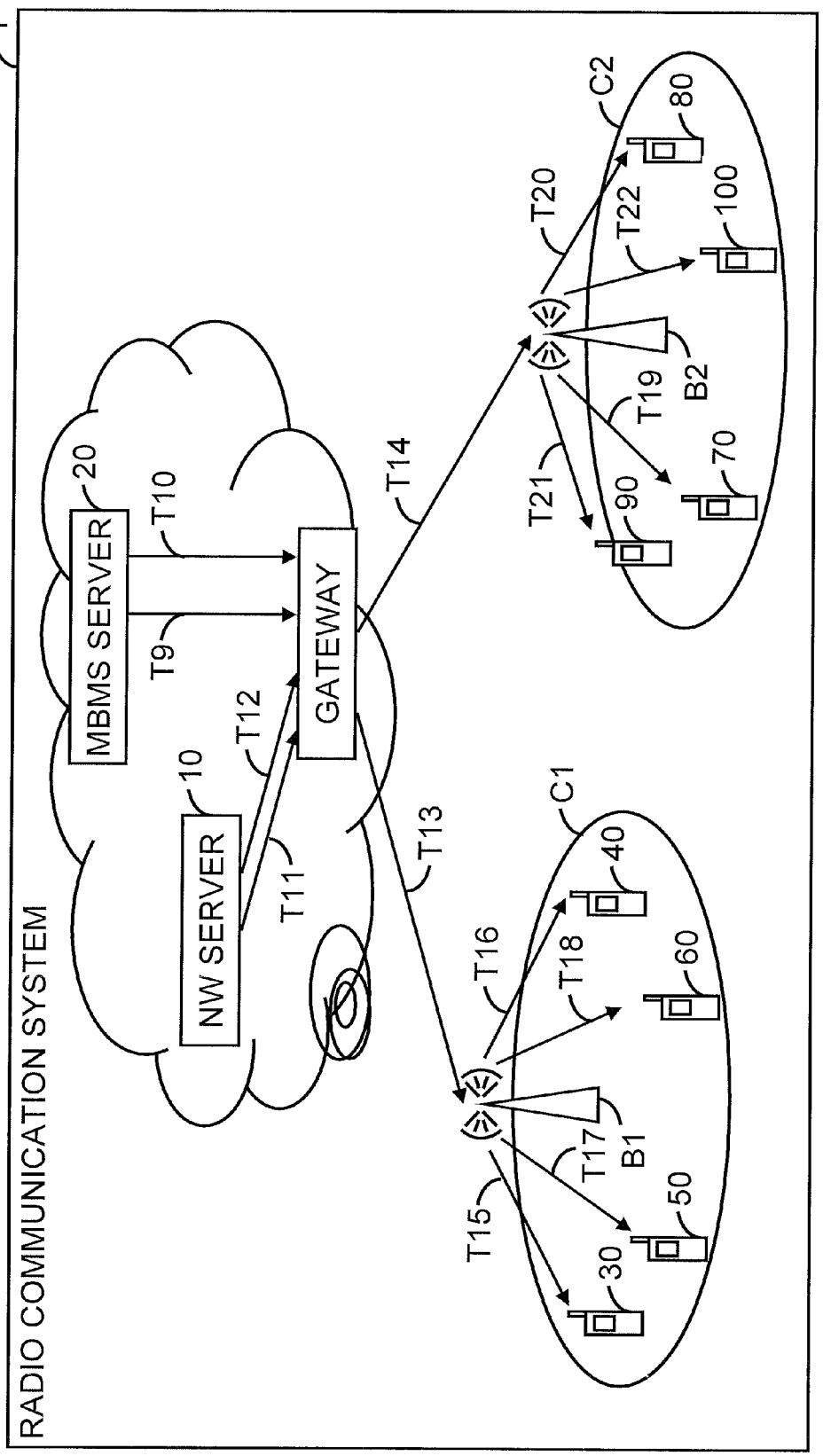
FIG. 11B is a diagram illustrating an exemplary process of distributing determined distribution information in a radio communication system according to an embodiment of the present invention.

FIG. 11B illustrates an exemplary process of distributing determined distribution information in the radio communication system 1.

In T9 and T10, the MBMS server 20 determines, for each base station ID, information to be distributed to mobile stations located in the cells of the base stations B1 and B2 on the basis of the KWs received from the NW server 10 in T7 and T8.

In T11 and T12, the NW server 10 transmits the respective search results to the mobile stations 30, 40, 70, and 80 that have requested the search.

In T13 and T14, the distribution information determined in T9 and T10 is distributed to the respective base stations B1 and B2 via the gateway.

In T15 to T22, the base stations B1 and B2 distribute the received distribution information to the mobile stations 30, 40, 50, 60, 70, 80, 90, and 100 belonging to the cells. Note that the distribution information is also distributed to the mobile stations 50, 60, 90, and 100 that have not performed information search in the cells of the base stations B1 and B2. Thus, the users of all mobile stations belonging to the cells of the base stations B1 and B2 may obtain latest information suitable for time and location.

Figure 12A:
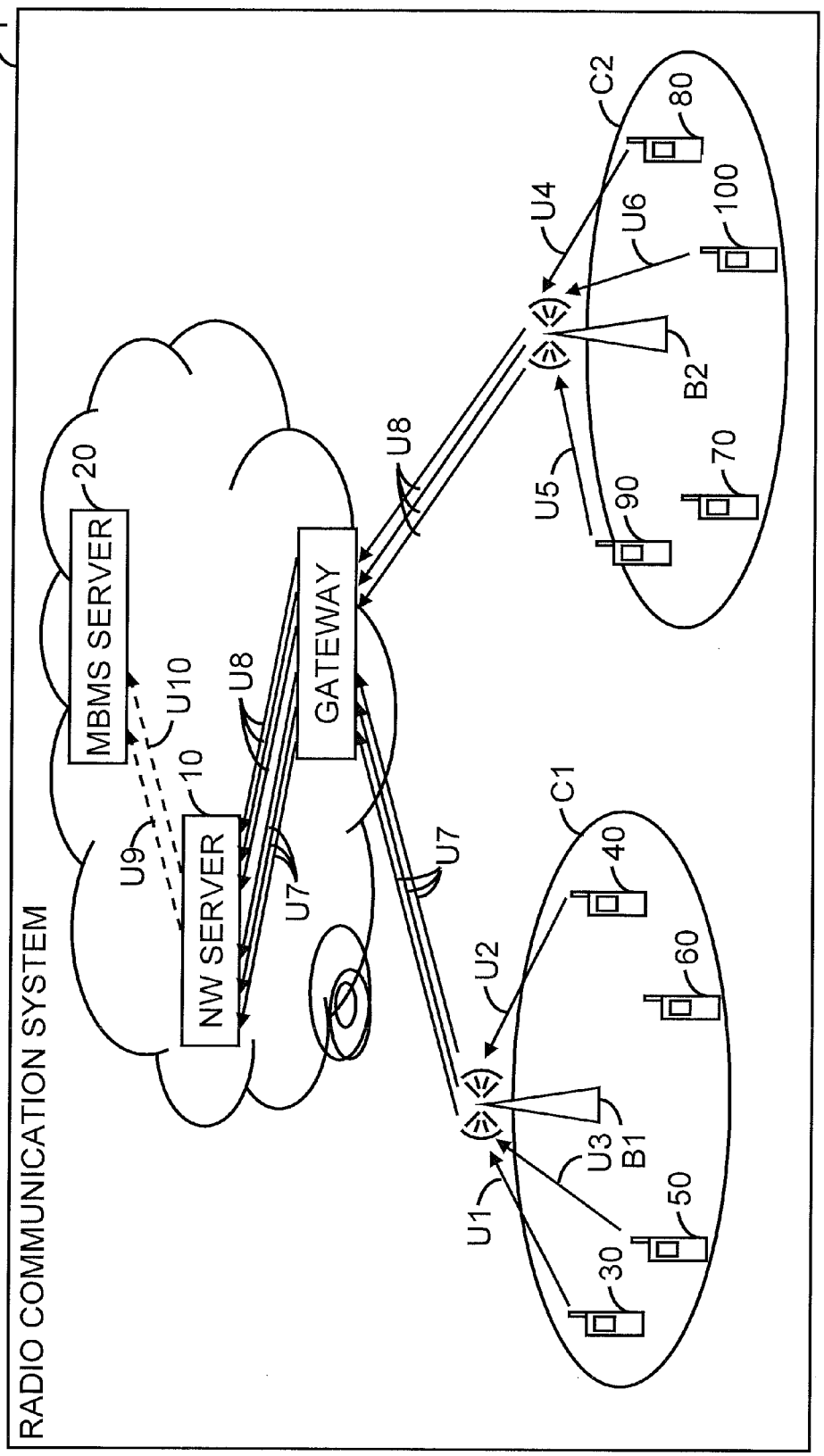
FIG. 12A is a diagram illustrating an exemplary process of searching for information to be distributed in a radio communication system according to an embodiment of the present invention.

As another example of utilizing the MBMS server 20, the radio communication system 1 may save resources in a shared channel (SCH) by using information distributed from the MBMS server 20. FIG. 12A illustrates an exemplary process of searching for information to be distributed in the radio communication system 1.

In U1 to U3, among the mobile stations 30, 40, 50, and 60 belonging to the cell C1 of the base station B1, the mobile stations 30 and 50 request information search by the same search word A and the mobile station 40 requests information search by a search word B.

In U4 to U6, among the mobile stations 70, 80, 90, and 100 belonging to the cell C2 of the base station B2, the mobile station 90 requests information search by a search word C and the mobile stations 80 and 100 request information search by the same search word D.

In U7, respective search requests from the mobile stations 30, 40, and 50 are individually transmitted to the NW server 10 via the gateway.

In U8, respective search requests from the mobile stations 80, 90, and 100 are individually transmitted to the NW server 10 via the gateway.

In U9, the NW server 10 notifies the MBMS server 20 of the same search word, as the KW, received from the mobile stations that have requested information search by the same search word. That is, since the mobile station 30 and the mobile station 50 request information search by the same search word A, the same search result may be distributed to these mobile stations. Thus, the NW server 10 notifies the MBMS server 20 of the KWs only for the mobile stations 30 and 50.

In U10, since the mobile station 80 and the mobile station 100 request information searches by the same search word D, the same search result may be distributed to these mobile stations. Thus, the NW server 10 notifies the MBMS server 20 of the KWs only for the mobile stations 80 and 100. At that time, the transmission unit 18 of the NW server 10 does not transmit search result regarding the KW of which the NW server 10 has notified the MBMS server 20.

Figure 12B:
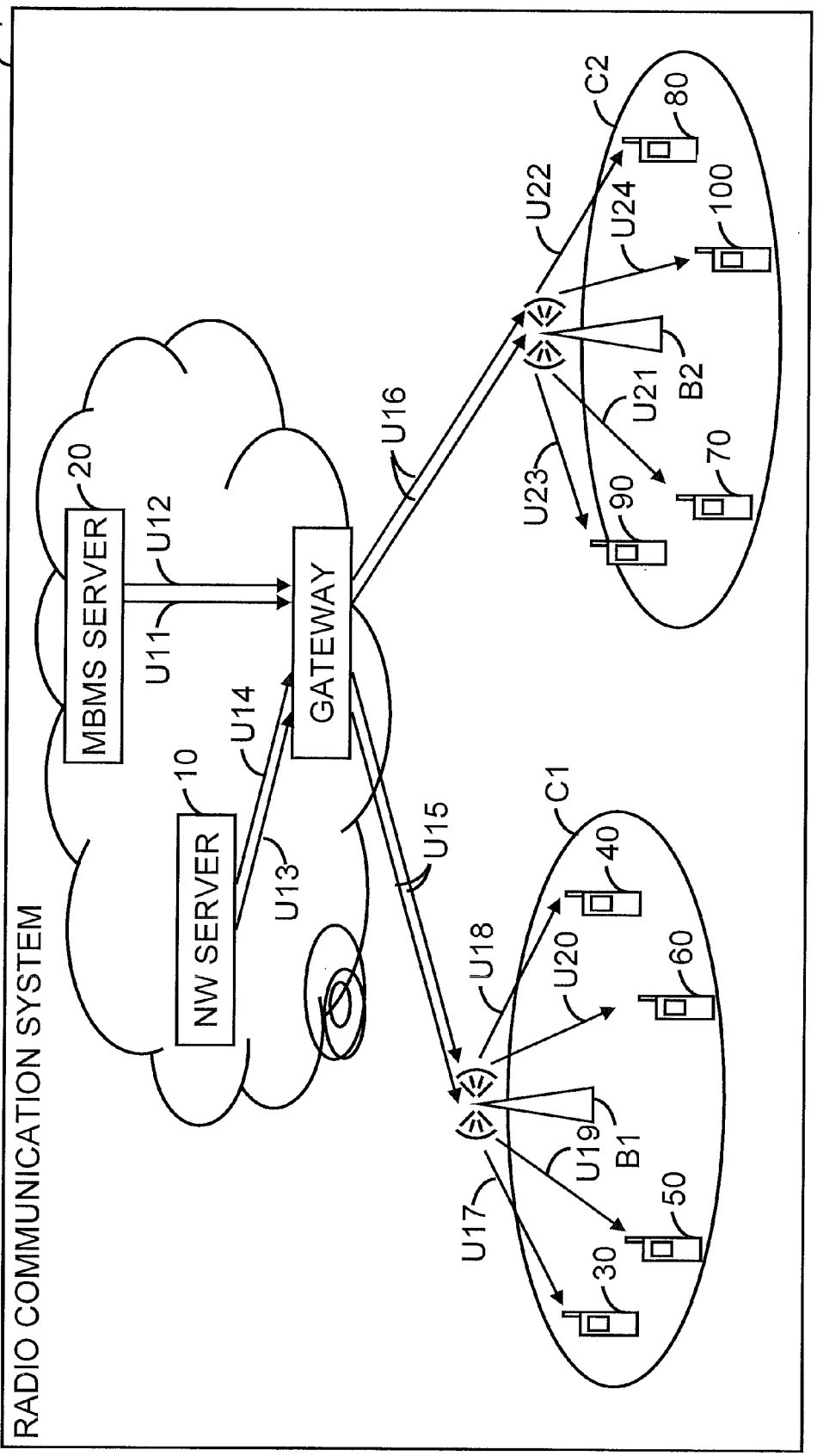
FIG. 12B is a diagram illustrating an exemplary process of distributing search result in a radio communication system according to an embodiment of the present invention.

FIG. 12B illustrates an exemplary process of distributing the search result in the radio communication system 1.

In U11, the MBMS server 20 distributes, on the basis of the KW received from the NW server 10, the search result for the same search word requested from a plurality of mobile stations. That is, since information search by the same search word A has been requested from the mobile stations 30 and 50, the search result for the search word A is not distributed from the NW server 10 but distributed from the MBMS server 20 in a lump.

In U12, since information search by the same search word D has been requested from the mobile stations 80 and 100, the search result for the search word D is not distributed from the NW server 10 but distributed from the MBMS server 20 in a lump.

Since the NW server 10 does not transmit the search results for the search words A and D as discussed above, the same search result may not be redundantly transmitted to the mobile stations 30, 50, 80, and 100.

In U13, the NW server 10 individually transmits the search result for the search word B to the mobile station 40 that has requested the information search by the search word B.

In U14, the NW server 10 individually transmits the search result for the search word C to the mobile station 90 that has requested the information search by the search word C.

In U15, the information distributed from the MBMS server 20 in U11 (the search result for the search word A) and the information transmitted from the NW server 10 in U13 (the search result for the search word B) are transmitted to the base station B1 via the gateway.

In U16, the information distributed from the MBMS server 20 in U12 (the search result for the search word D) and the information transmitted from the NW server 10 in U13 (the search result for the search word C) are transmitted to the base station B2 via the gateway.

In U17, the mobile station 30 receives the search result for the search word A, which has been distributed from the MBMS server 20.

In U18, the mobile station 40 receives the search result for the search word B, which has been transmitted from the NW server 10.

In U19, the mobile station 50 receives the search result for the search word A, which has been distributed from the MBMS server 20.

In U20, the mobile station 60 receives the search result for the search word A, which is the frequently used KW.

In U21, the mobile station 70 receives the search result for the search word D, which is the frequently used KW.

In U22, the mobile station 80 receives the search result for the search word D, which has been distributed from the MBMS server 20.

In U23, the mobile station 90 receives the search result for the search word C, which has been transmitted from the NW server 10.

In U24, the mobile station 100 receives the search result for the search word D, which has been distributed from the MBMS server 20.

As a result, the users of all mobile stations located in the cells C1 and C2 may obtain desired information.

As discussed above, the radio communication system 1 includes the NW server 10, the MBMS server 20 and the mobile stations 30, 40, 50, and 60. The NW server 10 includes the reception unit 11, the extraction unit 14 and the notification unit 15. The reception unit 11 receives information transmitted from the plurality of mobile stations 30, 40, 50, and 60 via the base station B1 together with the ID of the base station B1. The extraction unit 14 extracts, for each base station, a KW that is most frequently used by the plurality of mobile stations on the basis of the transmitted information and the ID of the base stations. The notification unit 15 notifies the MBMS server 20 of the KWs extracted by the extraction unit 14 together with the ID of the corresponding base station. The MBMS server 20 includes the reception unit 21 and the distribution unit 23. The reception unit 21 receives, from the NW server 10, the KWs transmitted from the notification unit 15 together with the ID of the corresponding base station. The distribution unit 23 distributes information corresponding to the KWs to the plurality of mobile stations 30, 40, 50, and 60 via the base station having the ID. The mobile station 30 includes the communication unit 31. The communication unit 31 receives the information distributed from the MBMS server 20 via the base station B1.

Whether distribution information is useful depends on whether the information is specific to an area. Although it may be possible to determine distribution information on the information distributing side by predicting information useful for a user, it may be difficult for an information provider to grasp needs of an information receiver under an environment of a user of a mobile station whose current location changes constantly. According to the above discussed radio communication system 1, the MBMS server 20 may autonomously change distribution information in accordance with the date, the time, and the location by determining different distribution information for different base station depending on the KW received from the NW server 10. That is, the radio communication system 1 multicast-distributes information that is different for different base station and dynamically changes. Therefore, information having a high relationship with the user of each mobile station may be provided.

In addition, processing load on a mobile station may be reduced in comparison with that according to a conventional technique in which a mobile station receives a plurality of pieces of distribution information and notifies its user of only distribution information matching a KW from among the received information. Further, according to the above-mentioned conventional technique, if information suited for the user is not included in the distribution information that the mobile station has received, it may be difficult for the user to receive desired information. However, in the radio communication system 1, since the distribution information is autonomously determined on the distributing side, such a fear as mentioned above is eliminated. In addition, since only the distribution information that has been determined on the distributing side is distributed in the radio communication system 1, the resource usage per mobile station is saved in comparison with a case in which distribution information is selected on the mobile station side. As a result, it may become possible to distribute useful information to more users by using the limited resources.

The above-mentioned information transmitted from a mobile station is included in at least one of a search word, information regarding a Web site, mail data, and call information. Since the contents of these pieces of transmitted information reflect the environment, taste, and attribute of the user of each mobile station, the NW server 10 may determine and distribute information that meets the needs of the user of each mobile station by extracting frequently used KWs from among these pieces of transmitted information.

In the radio communication system 1, the distribution unit 23 of the MBMS server 20 distributes information which differs depending on the time of distribution and the location of distribution. Distribution information that a user desires may differ, even for the same KW, depending on the season or time zone that the information is distributed, or on the location at which the information is distributed. Therefore, in the radio communication system 1, the MBMS server 20 may determine distribution information by taking into account not only the KW but also the distribution time and location of the information. Thus, such mismatch between the needs of a user and the distribution information may be avoided that information regarding year-end gifts is distributed in summer or information regarding stores is distributed in and around a mountain forest having a camp site. As a result, information that the user highly desires may be provided. The distribution unit 23 may determine distribution information by using the information regarding the distribution time and the distribution location combined, instead of using the information regarding the distribution time or the distribution location alternatively. Thus, information more suitable for the situation of the user is provided by taking both the date/time and the location into consideration.

In the radio communication system 1, when the information to be transmitted by the NW server 10 is the same as the information to be distributed by that the MBMS server 20, the NW server 10 stops transmission of the information. The distribution unit 23 of the MBMS server 20 multicast-distributes the information to the plurality of mobile stations 30, 40, 50, and 60. That is, although the transmission unit 18 of the NW server 10 transmits information to the mobile stations 30, 40, 50, and 60, the transmission unit 18 may stop the transmission to some mobile stations (mobile stations 30 and 50, for example) when the information to be transmitted to the some mobile stations is the same information. The distribution unit 23 of the MBMS server 20, in place of the NW server 10, distributes the same information to the mobile stations 30 and 50. For example, when the mobile stations 30 and 50 have requested the NW server 10 to perform a KW search, the search results to be transmitted from the NW server 10 to the mobile stations 30 and 50 may be the same as the information to be distributed from the MBMS server 20 to the mobile stations 30 and 50. In such a case, it is more effective to multicast-distribute the information collectively from the MBMS server 20 to the mobile stations 30 and 50 than to transmit the information from the NW server 10 individually to the mobile stations 30 and 50 from the viewpoint of saving the shared channel resources. In the radio communication system 1, when the information transmitted from the NW server 10 is the same as the information distributed from the MBMS server 20, the MBMS server 20 may distribute the information in a lump and the NW server 10 may stop transmitting the information. That is, by using the information distributed from the MBMS server 20, the NW server 10 may deliver the same information to each mobile station without individually allocating the shared channel resources to the mobile stations 30 and 50. Since the resources used for information transmission are saved in comparison with a case in which the MBMS server 20 is not used, information may be distributed to more users.

In the radio communication system 1, the communication unit 31 of the mobile station 30 transmits information to the NW server 10 via the base station B1 and receives information distributed from the MBMS server 20 via the base station B1. Since the mobile station 30 receives and displays the distribution information that the MBMS server 20 has determined on the basis of the KW, the mobile station need not perform processing such as selection of the distribution information by itself. Thus, the mobile station 30 may provide the user with information that meets the needs of the user with no load for such processing.

An application example of the radio communication system 1 will be discussed together with effects thereof.

An example in which the radio communication system 1 is applied to an amusement park will be discussed. In the present application example, it is supposed that visitors search for information regarding the waiting time for an attraction and the start time of an event in the amusement park. In such a case, the radio communication system 1 preferentially distributes information regarding attractions and events, which would attract notice on that day or in that time zone from among many attractions and events, on the basis of information (the number of KWs that the visitors have searched for and the number of pages that the visitors have browsed) transmitted from the visitors. Therefore, the visitors may obtain useful information suited for the situation with efficiency and in real time.

An example in which the radio communication system 1 is applied to a tourist resort will be discussed. In the present application example, it is supposed that travelers who visit the tourist resort search for information regarding the surroundings of the tourist resort. In such a case, the radio communication system 1 preferentially distributes information regarding popular spots where many travelers visit from among many seeing spots and famous places on the basis of information transmitted from the travelers. Since popular seeing spots and famous places may have been searched for a long period of time, the travelers may readily obtain desired information without inputting the name of an area around or a KW. In addition, since the information obtained at that time is not the one that an information provider intends to give but the information based on the information obtained from persons with experiences (other travelers), there is a high possibility that the information meets the needs of the travelers than information obtained from normal Web site search.

An example in which the radio communication system 1 is applied to a street event will be discussed. In the present application example, it is supposed that a surprise live performance or a temporal street speech is held in a city area and passersby come to watch the scene thereof at a distance. In such a case, the radio communication system 1 preferentially distributes information regarding the artists of the live performance or the speaker of the speech on the basis of information transmitted from the viewers. That is, when a live performance or a street speech is held in a city area, browsing and transmission/reception of information regarding persons and organizations concerned are rapidly increased around the site. As a result, the above information will be multicast-distributed to the mobile station of the passersby. Thus, the passersby may know readily and rapidly the situation (the cast, location, contents and ending time, for example) of the event even when it is difficult for the passersby to attend the live concert or speech up close.

An example in which the radio communication system 1 is applied to an overseas event will be discussed. In the present application example, it is supposed that a large-scale event such as Olympic games is held abroad and is difficult to attend it directly. In such an event, although information regarding popular games is readily obtained from Web sites and the like, it is difficult to obtain information regarding relatively unknown games. However, sometimes attention is focused on even a little-known game in a specific region because a local player plays in it. The radio communication system 1 is favorably used in such a case. The radio communication system 1 preferentially distributes information that may be highly desired in a specific region on the basis of information transmitted from only the specific region even when it is low in nationwide reputation and it is difficult to obtain related information. Thus, the inhabitants in that region may readily obtain information that meets their needs even when the game is low in nationwide reputation. The related information is multicast-distributed to all mobile stations in that region as long as the mobile stations belong to a communication area of a base station in the region. Thus, such merits may be obtained that the name values of a game (and players of that game) that persons have no chance to view it owing to its low reputation are increased.

In the above-mentioned embodiment, the radio communication system 1 is configured to count the use frequency of each KW and to determine distribution information on the basis of the counted use frequency for each base station. However, the radio communication system 1 may be configured to perform the counting and determination for a plurality of base stations, not limiting to the above configuration. That is, the extraction unit 14 of the NW server 10 counts, in a lump, the use frequencies of KWs included in the transmitted information that the reception unit 11 has collected from the plurality of base stations. The notification unit 15 notifies the MBMS server 20 of the most frequently used KW together with the IDs of the plurality of base stations as a result of the counting. When the reception unit 21 of the MBMS server 20 receives the KW and the IDs of the plurality of base stations, the distribution unit 23 distributes information corresponding to the KW received from the NW server 10 to the mobile stations located in the communication areas of the plurality of base stations. Thus, the radio communication system 1 may manage, in a lump, the KWs of the mobile stations connected to the plurality of base stations. In particular, when the number of mobile stations connected to a base station is small, the reliability of the extracted KWs may be reduced. However, since the radio communication system 1 extracts KWs focusing on a plurality of base stations, the population is increased and hence the reliability of the KWs is increased. As a result, compatibility of the KW-based distribution information with the users is also increased.

In the above-mentioned embodiment, the radio communication system 1 is configured to distribute the information corresponding to the frequently used KW only to the mobile stations in the cell of the base station that has provided the KW. However, not limiting to the above configuration, the radio communication system 1 may be configured to distribute the information also to mobile stations in the cells of surrounding base stations when a certain condition is met such as when the use frequency is significantly high. For example, the extraction unit 14 of the NW server 10 counts the usage of each KW on the KW list 12a for a predetermined period of time for each base station ID. When the use frequency of the most frequently used KW is significantly high (for example, more than two or three times that of the second most frequently used KW), the extraction unit 14 notifies the notification unit 15 of this fact. The notification unit 15 notifies the MBMS server 20 of the KW and the ID of the base station together with the fact that the use frequency of that KW is significantly high. When the reception unit 21 of the MBMS server 20 receives the notification, the distribution unit 23 distributes the information corresponding to the particularly frequently used KW to the base station corresponding to the notified base station ID and its surrounding base stations. Since the distribution information regarding the KW the use frequency of which is significantly high may be high in needs from users and importance, it is desirable to distribute it also to mobile stations connected to other base stations.

Thus, the radio communication system 1 may provide useful information for more users by distributing information as mentioned above also to the surrounding base stations. Instead of distributing information that is thought to be high in usability to the surrounding base stations, the radio communication system 1 may be configured to distribute the information repeatedly to a specific base station. In addition, the distribution unit 23 of the MBMS server 20 may change not only the distribution area but also the distribution frequency and distribution interval in accordance with the use frequency of the KW.

The above-mentioned and illustrated units are conceptual ones in function and are not necessarily configured physically as discussed and illustrated. For example, the KW list storing unit 12 may be integrated with the KW table storing unit 13 in the NW server 10, and the reception unit 21 may be integrated with the distribution unit 23 in the MBMS server 20. In addition, although the NW server 10 and the MBMS server 20 are configured by separate devices in the above embodiment, the functions of these servers may be integrated so as to be included in one device.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

What is claimed is:

1. A radio communication system comprising:
a network server including a first processor to
receive, together with an identifier for identifying a base station, communication information transmitted from a plurality of mobile stations via the base station,
extract, for the base station, a keyword frequently used in communications between the network server and the plurality of mobile stations on the basis of the received communication information and the received identifier, and
transmit the extracted keyword together with the identifier; and
a second server including a second processor to
receive, together with the identifier, the keyword transmitted from the network server, and
distribute distribution information corresponding to the received keyword to the plurality of mobile stations via a gateway server and the base station.

2. The radio communication system according to claim 1, wherein
the communication information is a word that the mobile stations have used for information search, information regarding a Web site, mail data, or call information.

3. The radio communication system according to claim 1, wherein
the second processor determines the distribution information in accordance with a time of the distribution or a location of the base station.

4. The radio communication system according to claim 1, wherein
the first processor transmits a response information to each of the plurality of mobile stations in response to the communication information, and
when the first processor has received, from some mobile stations among the plurality of mobile stations, communication information requiring same response information, the first processor transmits, instead of transmitting the same response information to each of the some mobile stations, the extracted keyword together with the identifier to the second server to request the second server to distribute the same response information to the some mobile stations.

5. A server comprising:
a processor to
receive, together with an identifier for identifying a base station, communication information transmitted from a plurality of mobile stations via the base station,
extract, for the base station, a keyword frequently used in communications between the network server and the plurality of mobile stations on the basis of the received communication information and the received identifier, and
transmit the extracted keyword together with the identifier to another server to request the another server to distribute distribution information corresponding to the keyword to the plurality of mobile stations via a gateway server and the base station.

6. A radio communication method executed by a radio communication system including a network server and a second server, the radio communication method comprising:
receiving, by the network server, communication information together with an identifier for identifying a base station, the communication information being transmitted from a plurality of mobile stations via the base station;
extracting for the base station, by the network server, a keyword frequently used in communications between the network server and the plurality of mobile stations on the basis of the received communication information and the received identifier;
transmitting, by the network server, the extracted keyword together with the identifier to the second server;
receiving together with the identifier, by the second server, the keyword transmitted from the network server; and
distributing distribution information corresponding to the received keyword to the plurality of mobile stations via a gateway server and the base station.

7. The radio communication system according to claim 1, wherein
the communication information is transmitted by the mobile stations to the base station.

8. The server according to claim 5, wherein
the communication information is transmitted by the mobile stations to the base station.

9. The radio communication method according to claim 6, further comprising
transmitting the communication information by the mobile stations to the base station.

* * * * *